(12) United States Patent
Nee

(10) Patent No.: US 11,105,285 B2
(45) Date of Patent: Aug. 31, 2021

(54) METHOD AND DEVICE FOR EXHAUST GAS AFTERTREATMENT IN AN INTERNAL COMBUSTION ENGINE

(71) Applicant: VOLKSWAGEN AKTIENGESELLSCHAFT, Wolfsburg (DE)

(72) Inventor: Christoph Nee, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/418,538

(22) Filed: May 21, 2019

(65) Prior Publication Data
US 2019/0360416 A1    Nov. 28, 2019

(30) Foreign Application Priority Data

May 22, 2018    (DE) .................... 10 2018 112 263.2

(51) Int. Cl.
*F02D 41/02*    (2006.01)
*B01D 46/00*    (2006.01)
(Continued)

(52) U.S. Cl.
CPC ....... *F02D 41/029* (2013.01); *B01D 46/0063* (2013.01); *B01D 53/9454* (2013.01);
(Continued)

(58) Field of Classification Search
CPC ........... F02D 41/029; F02D 2041/1418; F02D 41/1454; F02D 41/1456; F02D 41/1488;
(Continued)

(56) References Cited

U.S. PATENT DOCUMENTS

2002/0152743 A1    10/2002    Nakamura
2010/0191437 A1    7/2010    Brown et al.
(Continued)

FOREIGN PATENT DOCUMENTS

CN    1363013 A    8/2002
CN    101787919 A    7/2010
(Continued)

OTHER PUBLICATIONS

Search report for German Patent Application No. 10 2018 112 263.2, dated Apr. 16, 2019.
(Continued)

*Primary Examiner* — Audrey K Bradley
*Assistant Examiner* — Edward Bushard
(74) *Attorney, Agent, or Firm* — Pearl Cohen Zedek Latzer Baratz LLP

(57) ABSTRACT

The invention relates to a method for exhaust gas aftertreatment in an internal combustion engine. For purposes of the exhaust gas aftertreatment in the internal combustion engine, an exhaust gas system is provided in which a first three-way catalytic converter is arranged, as seen in the direction in which the exhaust gas of the internal combustion engine flows through the exhaust gas system, while at least another three-way catalytic converter is arranged downstream from the first three-way catalytic converter. Here, at least one lambda probe is arranged in an exhaust gas channel of the exhaust gas system upstream from the appertaining three-way catalytic converters. In the proposed method, a component temperature of the three-way catalytic converters is determined and compared to a light-OFF temperature. In this process, the lambda control of the internal combustion engine is carried out by means of the lambda probe upstream from the last three-way catalytic converter that has reached its light-OFF temperature.

(Continued)

Moreover, according to the invention, an exhaust gas aftertreatment system for carrying out such a method is being proposed.

12 Claims, 2 Drawing Sheets

(51) Int. Cl.
*B01D 53/94* (2006.01)
*F01N 3/023* (2006.01)
*F01N 3/035* (2006.01)
*F01N 3/10* (2006.01)
*F01N 9/00* (2006.01)
*F01N 11/00* (2006.01)

(52) U.S. Cl.
CPC ......... *B01D 53/9495* (2013.01); *F01N 3/023* (2013.01); *F01N 3/035* (2013.01); *F01N 3/101* (2013.01); *F01N 9/002* (2013.01); *F01N 11/007* (2013.01); *B01D 2279/30* (2013.01); *F01N 2430/06* (2013.01); *F01N 2560/025* (2013.01); *F01N 2900/1402* (2013.01); *F01N 2900/1602* (2013.01)

(58) Field of Classification Search
CPC ............. F02D 41/1477; F02D 41/0235; F02D 41/1441; F02D 2200/0802; B01D 46/0063; B01D 53/9454; B01D 53/9495; B01D 2279/30; F01N 3/0222; F01N 3/0231; F01N 3/0835; F01N 2250/02; F01N 2550/14; F01N 2900/0416; F01N 11/002; F01N 3/021; F01N 3/30; F01N 3/05; F01N 3/023; F01N 3/035; F01N 3/101; F01N 9/002; F01N 11/007; F01N 2430/06; F01N 2560/025; F01N 2900/1402; F01N 2900/1602; F01N 2550/02; F01N 2560/14; F01N 2900/1404; F01N 2900/1626; F01N 13/009; F01N 13/0093; F01N 9/00; F01N 3/22; F01N 9/005; F01N 2560/06

See application file for complete search history.

(56) References Cited

U.S. PATENT DOCUMENTS

| | | | |
|---|---|---|---|
| 2011/0072784 A1 | 3/2011 | Hepburn et al. | |
| 2011/0220084 A1* | 9/2011 | Burak | F02D 41/0255 |
| | | | 123/703 |
| 2016/0363031 A1 | 12/2016 | Mayer | |
| 2017/0370264 A1 | 12/2017 | Meier et al. | |
| 2018/0080357 A1* | 3/2018 | Jung | F01N 9/00 |
| 2019/0003360 A1* | 1/2019 | Bleckmann | F01N 3/2066 |

FOREIGN PATENT DOCUMENTS

| | | | | |
|---|---|---|---|---|
| CN | 202039925 U | 11/2011 | | |
| CN | 106321204 A | 1/2017 | | |
| DE | 10 2010 002 586 A1 | 9/2011 | | |
| DE | 10 2013 201 734 A1 | 8/2014 | | |
| DE | 10 2015 212 514 A1 | 1/2017 | | |
| DE | 102015212514 A1 * | 1/2017 | ........... | F02D 41/029 |
| DE | 10 2016 211 595 A1 | 12/2017 | | |
| DE | 10 2017 107 678 A1 | 10/2018 | | |
| DE | 10 2017 210 880 A1 | 1/2019 | | |
| EP | 2 884 066 A1 | 6/2015 | | |
| WO | WO 2017/108165 A1 | 6/2017 | | |

OTHER PUBLICATIONS

Search report for European Patent Application No. 19175604.8, dated Aug. 9, 2019.
Office Action and Search Report for Chinese Patent Application No. 201910429149.4, dated Dec. 7, 2020.

* cited by examiner

METHOD AND DEVICE FOR EXHAUST GAS AFTERTREATMENT IN AN INTERNAL COMBUSTION ENGINE

CROSS REFERENCE TO RELATED APPLICATION

This application claims priority from German Patent Application No. 10 2018 112 263.2, filed May 22, 2018, which is incorporated herein by reference in its entirety.

FIELD OF THE INVENTION

The invention relates to a method for exhaust gas aftertreatment in an internal combustion engine as well as to an exhaust gas aftertreatment system for carrying out such a method according to the generic parts of the independent claims.

BACKGROUND OF THE INVENTION

Future emissions legislation will make high demands with respect to engine raw exhaust gas emissions and to the exhaust gas aftertreatment in internal combustion engines. With the introduction of the emissions legislation Euro 6d-Temp, motor vehicles will have to meet the emissions limits during real-world operation (real driving emissions). The use of multi-stage exhaust gas aftertreatment concepts in the realm of gasoline engines raises questions for new emissions regulations in terms of the ability to regulate the various exhaust gas aftertreatment components as well as in terms of the quality of the regulation and the operational readiness of the exhaust gas aftertreatment components. In this context, it has been found that a lambda control concept with a rigidly configured control system only yields suboptimal emission results.

German patent application DE 10 2010 002 586 A1 discloses a method for operating an internal combustion engine for a motor vehicle having an exhaust gas system in which at least one catalytic converter and at least one lambda probe are installed. After a cold start, the internal combustion engine is operated alternately with a lean and a rich air-fuel ratio in order to warm up the catalytic converter. After the cold start, the lambda probe is warmed up in such a way that it is ready for operation after ten seconds at the maximum and the internal combustion engine is operated with a two-point regulation based on a signal from the lambda probe. In this process, a switchover between operation with a lean air-fuel ratio and operation with a rich air-fuel ratio is triggered in each case by the signal from the lambda probe.

German patent application DE 10 2013 210 734 A1 discloses a method for operating a lambda probe array in the exhaust gas system of an internal combustion engine having at least a first lambda probe upstream from a catalytic converter and with at least a second lambda probe downstream from the catalytic converter. In this context, the second lambda probe is configured as a step change sensor. Here, a diagnosis of a characteristic line offset of the first lambda probe and, if applicable, an adaptation of a characteristic line offset error are carried out. Here, for purposes of the diagnosis in the case of an active lambda adjustment, a value representing the oxygen storage capacity of the catalytic converter as well as another value representing the oxygen discharge capacity from the catalytic converter are ascertained. A characteristic line offset of the first lambda probe is calculated on the basis of the ratio of the oxygen storage capacity to the oxygen discharge capacity.

European patent application EP 2 884 066 A1 discloses a method for diagnosing an object such as a catalytic converter or a filter. For purposes of obtaining very precise information about the function of the catalytic converter, it is provided here that, in order to measure catalytic reactivity, a device is used to impinge a test medium having a defined composition, such as propane gas or carbon monoxide, onto an end face of the catalytic converter through an opening, and the concentration of at least one reduced or oxidized constituent of the test medium is measured at a downstream position after passage through the catalytic converter. Such an impingement with an (exhaust) gas having a defined composition, however, is only possible in the laboratory. Consequently, such a method is not suitable for optimizing the emissions under real-world driving conditions.

A drawback of the prior-art methods, however, is that they do not sufficiently take into account the temperature-dependent conversion behavior of the catalytic converters and thus they only lead to a suboptimal exhaust gas aftertreatment, especially during a starting phase or after an operating phase in which the exhaust gas system has cooled off considerably.

SUMMARY OF THE INVENTION

Before this backdrop, the invention is based on the objective of improving the conversion behavior of the catalytic converters arranged in the exhaust gas system of the internal combustion engine, thereby further reducing the emission of pollutants under real-world driving conditions.

According to the invention, this objective is achieved by a method for exhaust gas aftertreatment in an internal combustion engine whose outlet is connected to an exhaust gas system, whereby—as seen in the direction in which an exhaust gas of the internal combustion engine flows through an exhaust gas channel of the exhaust gas system—a first three-way catalytic converter is arranged in the exhaust gas system and at least another three-way catalytic converter is arranged downstream from the first three-way catalytic converter. Here, a first lambda probe is arranged in the exhaust gas channel upstream from the first three-way catalytic converter, while another lambda probe is arranged downstream from the first three-way catalytic converter and upstream from the other three-way catalytic converter. The method comprises at least the following steps:
- determination of the component temperatures of the first and second three-way catalytic converters,
- comparison of the component temperatures of the first and second three-way catalytic converters to the appertaining light-OFF temperatures of the three-way catalytic converters,
- lambda control of the internal combustion engine by means of the lambda probe upstream from the last three-way catalytic converter—as seen in the flow direction—that has reached its light-OFF temperature.

With a method according to the invention, the component temperatures momentarily prevailing on the three-way catalytic converters can be taken into account in order to expand the lambda control to the largest possible controlled segment and thus to variably adapt it to the conditions that are momentarily prevailing in the exhaust gas system.

Thanks to the features cited in the dependent claims, advantageous refinements and improvements of the method put forward in the independent claim are made possible.

In a preferred embodiment of the invention, it is provided that the lambda control is carried out on the basis of the principle of natural frequency control. Within the scope of this patent application, the term natural frequency lambda control refers to a control system in which the gas flows through the entire catalytic converter volume that is being used until the lean or rich breakthrough of each pilot-controlled component occurs. As a result, the "breakthrough" of the component can be detected at the lambda probe downstream from the catalytic converter volume through which the gas is flowing, and only then is a switchover made to the other pilot control. This approach means that it is indispensible to have a subsequent converter volume through another catalytic converter, especially another three-way catalytic converter. If the lambda control is carried out according to the principle of natural frequency control, then the entire converter volume of the catalytic converter can be used to convert the emissions. Moreover, in this process, ageing hot spots in the catalytic converter can be avoided by means of the alternative balanced switchover prior to a breakthrough, thereby increasing the service life of the catalytic converter. Furthermore, a rapid adjustment of the lambda middle position is possible over the entire exhaust gas system, whereby an offset can be adapted. As a result, it is possible to achieve a very effective exhaust gas aftertreatment with minimal emissions.

In a preferred embodiment of the method, it is provided that, after a cold start of the internal combustion engine, the lambda control is carried out by the first lambda probe upstream from the first three-way catalytic converter. Once the internal combustion engine has been started, first of all, the first catalytic converter near the engine warms up and, as a rule, it is the first component of the exhaust gas aftertreatment to reach its light-OFF temperature $T_{LOK1}$. Therefore, during the starting phase, it is expedient to strive towards an optimal conversion of the exhaust gases through the first three-way catalytic converter until the exhaust gas aftertreatment components located further downstream—as seen in the direction in which the exhaust gas flows through the exhaust gas channel—have likewise reached their light-OFF temperature.

Here, when a three-way catalytic converter located further downstream in the exhaust gas system has reached its light-OFF temperature, it is preferable for the lambda control by the lambda probe to be expanded upstream from this additional three-way catalytic converter. By expanding the lambda control once the light-OFF temperature $T_{LOK2}$ of the second three-way catalytic converter has been reached, both three-way catalytic converters can be operated under the best possible operating conditions in order to convert pollutants, so that an emission optimum is reached for the exhaust gas aftertreatment.

In a preferred embodiment of the invention, it is provided for the exhaust gas aftertreatment system to also comprise a particulate filter, whereby, in addition to the component temperatures of the three-way catalytic converters, the component temperature of the particulate filter is likewise determined. Seeing that a limit value for the particle emissions has also been prescribed for gasoline engines since the emissions legislation Euro 6 went into force, it might be necessary to use a particulate filter for the exhaust gas aftertreatment in a large number of motor vehicles that have gasoline engines. The particulate filter can have a coating that has a three-way catalytic effect. Such a particulate filter is referred to as a four-way catalytic converter. Within the scope of this patent application, such a four-way catalytic converter is also to be understood as a three-way catalytic converter since it fulfills the function of a three-way catalytic converter.

Here, it is preferable if the possibility to regenerate the particulate filter above a threshold temperature of the particulate filter is detected. An oxygen excess in the particulate filter and, at the same time, a minimum temperature of 550° C. are both needed in order to oxidize the soot particles that have been retained in the particulate filter and in order to regenerate the particulate filter. When such a temperature is detected, it is very simple to carry out a (partial) regeneration of the particulate filter by adjusting the air-fuel ratio in the "lean" direction, that is to say, in the direction of a superstoichiometric air-fuel ratio.

It is especially preferable for the internal combustion engine to be operated at a superstoichiometric air-fuel ratio when it is detected that the particulate filter needs to be regenerated and, at the same time, when it is detected that the temperature of a component of the particulate filter is above the threshold temperature is detected. The superstoichiometric operation oxidizes the soot that has been retained in the particulate filter.

In another improvement of the method, it is provided that a superstoichiometric amplitude is selected by means of the control concept in such a way that a continuous regeneration of the soot that has been retained in the particulate filter is carried out within the relevant temperature range. Through the selection of a suitable amplitude, it is possible that no lean breakthrough occurs through the second three-way catalytic converter while the particulate filter is being regenerated and consequently, that no increase in the nitrogen oxide emissions occurs. Thus, an essentially emission-neutral regeneration of the particulate filter can be carried out.

Here, it is particularly preferred if a correspondingly larger quantity of oxygen in the exhaust gas is provided exclusively for the particulate filter and if an essentially stoichiometric exhaust gas flows through the three-way catalytic converter within the regulating oscillations. In this context, the amplitude of the lambda control can be selected in such a way that the oxygen storage units of the three-way catalytic converters, especially of the second three-way catalytic converter, are filled or emptied, without a lean or rich breakthrough occurring through the appertaining three-way catalytic converter. As a result, an increase in secondary emissions during the regeneration of the particulate filter can be avoided.

According to the invention, an exhaust gas aftertreatment system is being put forward for an internal combustion engine, having an exhaust gas system in which a first three-way catalytic converter is arranged—as seen in the direction in which an exhaust gas flows through an exhaust gas channel of the exhaust gas system—and at least another three-way catalytic converter is arranged downstream from the first three-way catalytic converter, whereby a first lambda probe is arranged upstream from the first three-way catalytic converter while another lambda probe is arranged downstream from the first three-way catalytic converter and upstream from the second three-way catalytic converter, and also having a control unit that is configured to carry out a method according to the invention when a machine-readable program code is being executed by the control unit. An exhaust gas aftertreatment system according to the invention makes it possible to take into account the appertaining operational readiness and its conversion capacity as a function of the component temperature, and thus to ensure an emission-optimal exhaust gas aftertreatment. Moreover, special operating situations such as, for example, the regeneration of a particulate filter, can be taken into account during the exhaust gas aftertreatment in order to further improve the result of the exhaust gas aftertreatment and in order to avoid secondary emissions.

In a preferred embodiment of the exhaust gas aftertreatment system, it is provided for a particulate filter to be arranged downstream from the first three-way catalytic converter and upstream from the second three-way catalytic converter. Seeing that a limit value for the particle emissions has also been prescribed for gasoline engines since the emissions legislation Euro 6 went into force, it might be necessary to use a particulate filter for the exhaust gas aftertreatment in a large number of motor vehicles that have gasoline engines. Thus, not only the gaseous exhaust gas constituents but also the particles can be removed from the exhaust gas.

The particulate filter can have a catalytically active coating and can be configured as a four-way catalytic converter. Thanks to the catalytically active coating on the particulate filter, the latter additionally fulfills the function of a three-way catalytic converter. Thus, the total catalytic converter volume that is available for converting pollutants can be increased, especially so as to make additional catalytic converter volume available at high loads and to avoid an increase in the emissions under real-world driving conditions.

In this context, it is preferable if a second lambda probe is arranged downstream from the first three-way catalytic converter and upstream from the particulate filter, and if a third lambda probe is arranged in the exhaust gas channel downstream from the particulate filter and upstream from the second three-way catalytic converter. As a result, a lambda control is possible for every component that is three-way catalytically active, so that an optimal result can be achieved in terms of the conversion capacity.

In an advantageous embodiment of the invention, a secondary air system is provided with which secondary air can be blown into the outlet of the internal combustion engine or into the exhaust gas system downstream from the outlet and upstream from the first three-way catalytic converter, especially downstream from the outlet and upstream from a turbine of an exhaust gas turbocharger, and into the exhaust gas channel. A secondary air system can accelerate the heating up of the three-way catalytic converters following a cold start of the internal combustion engine. Moreover, the oxygen needed to regenerate the particulate filter can be supplied without the internal combustion engine having to be operated at a superstoichiometric air-fuel ratio and without increasing the raw emissions of the internal combustion engine, especially the nitrogen oxide emissions.

Unless otherwise indicated in specific cases, the various embodiments of the invention put forward in this application can be advantageously combined with each other.

BRIEF DESCRIPTION OF THE DRAWINGS

The invention is explained in embodiments with reference to the accompanying drawings. The following is shown.

DETAILED DESCRIPTION OF THE INVENTION

Figure 1:
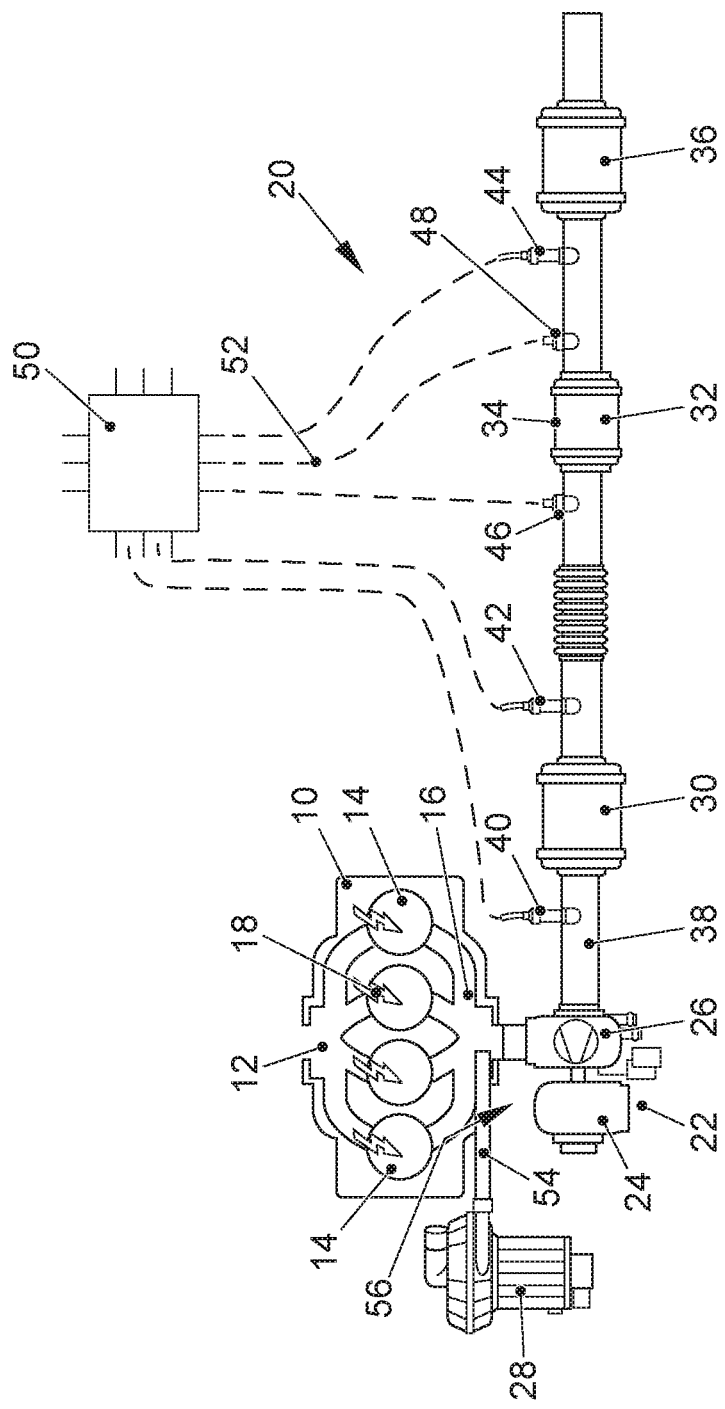
FIG. 1 an internal combustion engine with an exhaust gas aftertreatment system for carrying out a method according to the invention.

FIG. 1 shows an internal combustion engine 10 configured as a gasoline engine that is externally ignited by spark plugs 18. The internal combustion engine 10 has an intake 12, a plurality of combustion chambers 14 and an outlet 16. The outlet 16 of the internal combustion engine 10 is connected to an exhaust gas system 20. The internal combustion engine 10 is preferably configured as an internal combustion engine 10 that is charged by means of an exhaust gas turbocharger 22. For this purpose, the exhaust gas turbocharger 22 has a turbine 26 that is arranged in an exhaust gas channel 38 of the exhaust gas system 20 and that drives a compressor 24 in an air supply system (not shown here) of the internal combustion engine 10, thereby improving the filling of the combustion chambers 14. In the exhaust gas channel 38—as seen in the direction in which an exhaust gas flows through the exhaust gas channel 38—a first three-way catalytic converter 30 is arranged downstream from the turbine 26, a particulate filter 32 is arranged downstream from the first three-way catalytic converter 30, and a second three-way catalytic converter 36 is arranged downstream from the particulate filter 32. The particulate filter 32 can have a three-way catalytically active coating and can be configured as a so-called four-way catalytic converter 34. A first lambda probe 40 is arranged downstream from the turbine 26 of the exhaust gas turbocharger 22 and upstream from the first three-way catalytic converter 30, said first lambda probe 40 preferably being configured as a broadband lambda probe. A second lambda probe 42 is arranged downstream from the first three-way catalytic converter 30 and upstream from the particulate filter 32 or from the four-way catalytic converter 34. A third lambda probe 44 is arranged in the exhaust gas channel 38 downstream from the particulate filter 32 or from the four-way catalytic converter 34 and upstream from the second three-way catalytic converter 36. A first temperature sensor 46 is arranged in the exhaust gas channel 38 upstream from the first three-way catalytic converter 30 and upstream from the particulate filter 32 or from the four-way catalytic converter 34. A second temperature sensor 48 is arranged downstream from the particulate filter 32 or from the four-way catalytic converter 34 and upstream from the second three-way catalytic converter 36. The lambda probes 40, 42, 44 and the temperature sensors 46, 48 are connected via signal lines to a control unit 50 of the internal combustion engine 10. The internal combustion engine 10 can have a secondary air system 28, 54, 56 that comprises a secondary air pump 28, a secondary air line 54 and a secondary air valve 56. The secondary air line 54 opens up into the cylinder head on the outlet side of the internal combustion engine 10 or in a section of the exhaust gas channel 38 upstream from the first three-way catalytic converter 30, especially downstream from the outlet 16 and upstream from the turbine 26 of the exhaust gas turbocharger 22.

The invention puts forward a lambda control concept that takes into account knowledge about the component temperature ($T_{K1}$, $T_{K2}$, $T_{OPF}$) of each individual exhaust gas aftertreatment component 30, 32, 34, 36 and that adapts its amplitude of control and trim regulation to the largest possible controlled segment. Moreover, the boundary conditions of the exhaust gas aftertreatment components 30, 32, 34, 36 are reflected in the amplitude of control and in the parameters of the controlled segment so that an optimal setting is achieved in terms of the best emission point that applies in each case.

The invention comprises a lambda control according to the principle of natural frequency control for a multi-stage exhaust gas aftertreatment system with more than one catalytic converter. Here, the momentarily prevailing component temperature $T_{K1}$, $T_{K2}$, $T_{OPF}$ of the exhaust gas aftertreatment components 30, 32, 34, 36, especially of the three-way catalytic converters 30, 36, is taken into account, either by means of sensors—especially by means of the temperature sensors 46, 48 shown in FIG. 1—or else by means of an exhaust gas temperature model, in order to expand the natural frequency to the largest possible controlled segment. In case of a thoroughly warmed-up first three-way catalytic converter 30, the natural frequency is effectuated by means of the first lambda probe 40 and by means of the parameters known for this controlled segment. As soon as the other exhaust gas aftertreatment components 32, 34, 36 have also been warmed up on the basis of the driving profile selected by the customer and as soon as they have reached their light-OFF temperature $T_{LOK2}$, the lambda control is automatically expanded to these additional exhaust gas aftertreatment components 32, 34, 36, especially to the second three-way catalytic converter 36 and, in each case, specifically the lambda probe 42, 44 that is before the most recently activated exhaust gas aftertreatment component is used to evaluate control breakthroughs. If the activation conditions of a downstream exhaust gas aftertreatment component are no longer present, especially when the exhaust gas system 20 cools off or due to a systematic switching off of these exhaust gas aftertreatment components 32, 34, 36, then the lambda control is reduced to the minimal control level, that is to say, exclusively to control by the first lambda probe 40. Moreover, the special features of the appertaining exhaust gas aftertreatment component 30, 32, 34, 36 can be taken into account within the scope of the lambda control. When an HC adsorber—preferably arranged near the engine—is used as the first component of the exhaust gas aftertreatment, the lambda control is configured in such a way that there is more of a tendency for excess unburned hydrocarbons (HC) to be formed during the cold start of the internal combustion engine 10, since they can accumulate in the HC adsorber. In this case, a superstoichiometric control strategy is not conducive to achieve the envisaged objective.

When a particulate filter 32, 34 is used, the proposed concept for lambda control can serve to select a superstoichiometric amplitude of control in such a way that a continuous regeneration of the soot retained in the particulate filter 32, 34 takes place in the relevant temperature range. Here, on the basis of the known segment times, a formation of the amplitude of control can be selected in such a way that only for the particulate filter 32, 34 is a correspondingly higher quantity of oxygen provided in the exhaust gas and stoichiometric operation is possible for the three-way catalytic converters 30, 36 within one regulating oscillation. Thus, the method can achieve an optimum in terms of emissions.

Figure 2:
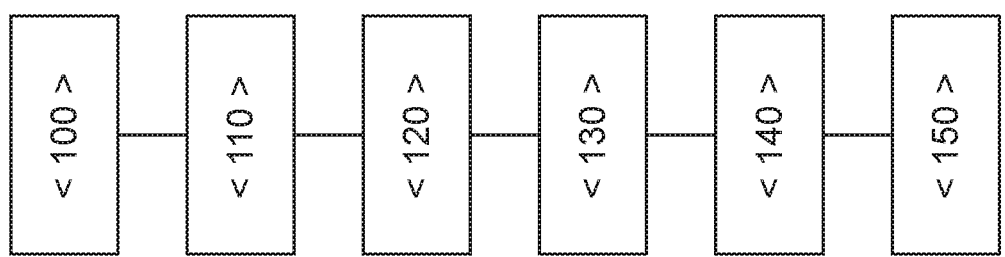
FIG. 2 a flow chart for carrying out a method according to the invention for exhaust gas aftertreatment in an internal combustion engine.

FIG. 2 shows a flow chart of a method according to the invention for exhaust gas aftertreatment. When the internal combustion engine 10 is started, a first method step <100> determines the component temperatures $T_{K1}$, $T_{K2}$ of the three-way catalytic converters 30, 36 and of other exhaust gas aftertreatment components 32, 34 that might be present. In a method step <110>, these temperatures $T_{K1}$, $T_{K2}$ are then compared to the individual light-OFF temperatures $T_{LOK1}$, $T_{LOK2}$. Initially, the natural frequency control is limited to the first three-way catalytic converter 30 and a lean or rich breakthrough through the first three-way catalytic converter 30 that has been detected by the lambda probe 42 is evaluated for the switchover of the amplitude of control, that is to say, for a switchover from a slightly substoichiometric operation to a slightly superstoichiometric operation and vice versa.

In another method step <120>, during continuous operation of the internal combustion engine 10, the additional exhaust gas aftertreatment components 32, 34, 36 arranged downstream from the first three-way catalytic converter 30 also warm up and reach their light-OFF temperature $T_{LOK2}$. Once the light-OFF temperature $T_{LOK2}$ has been reached in the second three-way catalytic converter 36, the lambda control is expanded to the third lambda probe 44 and, if applicable, to additional lambda probes. In case of operation of the natural frequency control over several three-way catalytic converters 30, 36, special requirements of the exhaust gas aftertreatment can be taken into account. These include especially the warm-up operation, the regeneration of the particulate filter 32, 34, or a diagnostic function of the exhaust gas aftertreatment components 30, 32, 34, 36 and/or of the lambda probes 40, 42, 44.

If a method step <130> ascertains a component temperature of 550° C. or more for the particulate filter 32, 34, then oxidation of the soot retained in the particulate filter is possible. For this purpose, in a method step <140>, additional oxygen is provided by adjusting the air-fuel ratio of the internal combustion engine 10 to a superstoichiometric ratio or by blowing secondary air into the exhaust gas system 20. Owing to the continuous lambda measurement and adaptation of the segment parameters of the controlled segment, the gas travel time through the exhaust gas system 20 to the particulate filter 32, 34 is known and can be taken into consideration in the pilot control of the amplitude for the superstoichiometric operating section. As soon as a lean breakthrough at the second lambda probe 42 downstream from the first three-way catalytic converter 30 is detected, in a method step <150>, a certain additional quantity of oxygen is fed into the exhaust gas system 20, thus effectuating a discharge of the soot mass from the particulate filter 32, 34.

When an HC adsorber is used, the loading of the HC adsorber can likewise be balanced and can be taken into account in the configuration of the superstoichiometric amplitude in order to regenerate the HC adsorber.

LIST OF REFERENCE NUMERALS 10 internal combustion engine
12 intake
14 combustion chamber
16 outlet
18 spark plug
20 exhaust gas system
22 exhaust gas turbocharger
24 compressor
26 turbine
28 secondary air pump
30 first three-way catalytic converter
32 gasoline particulate filter
34 four-way catalytic converter
36 second three-way catalytic converter
37 exhaust gas channel
40 first lambda probe
42 second lambda probe
44 third lambda probe
46 first temperature sensor
48 second temperature sensor
50 control unit
52 signal line
54 secondary air line
56 secondary air valve

The invention claimed is:

1. A method for exhaust gas aftertreatment in an internal combustion engine whose outlet is connected to an exhaust gas system, wherein, as seen in the direction in which an exhaust gas flows through the exhaust gas system, a first three-way catalytic converter is arranged in the exhaust gas system, a second catalytic converter is arranged downstream from the first three-way catalytic converter, and a third three-way catalytic converter is arranged downstream from the second catalytic converter, wherein the second catalytic converter is configured as a four-way catalytic converter or as a second three-way catalytic converter, wherein a first lambda probe is arranged in an exhaust gas channel of the exhaust gas system upstream from the first three-way catalytic converter, a second lambda probe is arranged downstream from the first three-way catalytic converter and upstream from the second catalytic converter, and a third lambda probe is arranged downstream from the second catalytic converter and upstream from the third three-way catalytic converter, the method comprising the following steps:
    determining component temperatures of the first three-way catalytic converter, the second catalytic converter and the third three-way catalytic converter,
    comparing the component temperatures of the first three-way catalytic converter, the second catalytic converter and the third three-way catalytic converter to the appertaining light-OFF temperatures of the first three-way catalytic converter, the second catalytic converter and the third three-way catalytic converter,
    when the component temperature of the second catalytic converter has reached its light-OFF temperature, lambda controlling the internal combustion engine by means of the second lambda probe, and
    when the component temperature of the third three-way catalytic converter has reached its light-OFF temperature, lambda controlling the internal combustion engine by means of the third lambda probe.

2. The method according to claim 1, wherein the lambda controlling is carried out on the basis of the principle of natural frequency control.

3. The method according to claim 1, wherein, after a cold start of the internal combustion engine, the lambda controlling is carried out by the first lambda probe upstream from the first three-way catalytic converter.

4. The method according to claim 1, wherein the second catalytic converter comprises a particulate filter, and wherein, the step of determining the component temperature of the second catalytic converter comprises determining a component temperature of the particulate filter.

5. The method according to claim 4, further comprising detecting the possibility to regenerate the particulate filter above a threshold temperature of the particulate filter.

6. The method according to claim 5, wherein the internal combustion engine is operated at a superstoichiometric air-fuel ratio ($\lambda>1$) when the need to regenerate the particulate filter is detected and, at the same time, when a component temperature above the threshold temperature of the internal combustion engine is detected.

7. The method according to claim 4, wherein a superstoichiometric amplitude is selected in such a way that a continuous regeneration of soot that has been retained in the particulate filter is carried out within a relevant temperature range.

8. The method according to claim 7, wherein a correspondingly larger quantity of oxygen in the exhaust gas is provided exclusively for the particulate filter and an essentially stoichiometric exhaust gas flows through the three-way catalytic converter within regulating oscillations.

9. An exhaust gas aftertreatment system for an internal combustion engine, having:
    an exhaust gas system in which:
        a first three-way catalytic converter is arranged, and
        as seen in the direction in which an exhaust gas flows through an exhaust gas channel of the exhaust gas system;
        a second catalytic converter is arranged downstream from the first three-way catalytic converter, wherein the second catalytic converter is configured as a four-way catalytic converter or as a second three-way catalytic converter, and
        a third three-way catalytic converter is arranged downstream from the second catalytic converter,
    a first lambda probe arranged upstream from the first three-way catalytic converter,
    a second lambda probe arranged downstream from the first three-way catalytic converter and upstream from the second catalytic converter,
    a third lambda probe arranged downstream from the second catalytic converter and upstream from the third three-way catalytic converter, and
    a control unit that is configured to:
        determine component temperatures of the first three-way catalytic converter, the second catalytic converter and the third three-way catalytic converter,
        compare the component temperatures of the first three-way catalytic converter, the second catalytic converter and the third three-way catalytic converter to the appertaining light-OFF temperatures of the first three-way catalytic converter, the second catalytic converter and the third three-way catalytic converter, and
        when the component temperature of the second catalytic converter has reached its light-OFF temperature, lambda controlling the internal combustion engine by means of the second lambda probe, and
        when the component temperature of the third three-way catalytic converter has reached its light-OFF temperature, lambda controlling the internal combustion engine by means of the third lambda probe.

10. The exhaust gas aftertreatment system according to claim 9, wherein the second catalytic converter is configured as the four-way catalytic converter, and the second catalytic converter comprises a particulate filter.

11. The exhaust gas aftertreatment system according to claim 10, wherein the particulate filter has a catalytically active coating.

12. The exhaust gas aftertreatment system according to claim 9, further comprising a secondary air system, with which secondary air can be blown into the outlet of the internal combustion engine or into the exhaust gas system downstream from the outlet and upstream from the first three-way catalytic converter.

* * * * *